United States Patent
Wang et al.

(10) Patent No.: US 10,991,925 B2
(45) Date of Patent: Apr. 27, 2021

(54) COATINGS FOR COMPONENTS OF ELECTROCHEMICAL CELLS

(71) Applicant: Sion Power Corporation, Tucson, AZ (US)

(72) Inventors: Zhongchun Wang, Sunnyvale, CA (US); Hui Du, Tucson, AZ (US); Chariclea Scordilis-Kelley, Tucson, AZ (US); Tracy Earl Kelley, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 119 days.

(21) Appl. No.: 16/098,654

(22) PCT Filed: Jun. 19, 2017

(86) PCT No.: PCT/US2017/038103
§ 371 (c)(1),
(2) Date: Nov. 2, 2018

(87) PCT Pub. No.: WO2017/222967
PCT Pub. Date: Dec. 28, 2017

(65) Prior Publication Data
US 2020/0243824 A1    Jul. 30, 2020

Related U.S. Application Data

(60) Provisional application No. 62/352,654, filed on Jun. 21, 2016.

(51) Int. Cl.
| | | |
|---|---|---|
| H01M 2/16 | (2006.01) | |
| C07F 9/00 | (2006.01) | |
| H01M 4/134 | (2010.01) | |
| H01M 4/38 | (2006.01) | |
| H01M 10/052 | (2010.01) | |
| H01M 10/0525 | (2010.01) | |
| H01M 4/02 | (2006.01) | |

(52) U.S. Cl.
CPC ............ *H01M 2/166* (2013.01); *C07F 9/005* (2013.01); *H01M 2/1686* (2013.01); *H01M 4/134* (2013.01); *H01M 4/382* (2013.01); *H01M 10/052* (2013.01); *H01M 10/0525* (2013.01); *H01M 2004/027* (2013.01)

(58) Field of Classification Search
CPC .. H01M 2/166; H01M 2/1666; H01M 2/1686; H01M 4/62; H01M 4/134; H01M 4/1395; H01M 4/382; H01M 10/052; H01M 10/0525; H01M 2004/027; C07F 9/005
See application file for complete search history.

(56) References Cited

U.S. PATENT DOCUMENTS

| | | |
|---|---|---|
| 4,664,991 A | 5/1987 | Perichaud et al. |
| 4,739,018 A | 4/1988 | Armand et al. |
| 4,833,048 A | 5/1989 | De Jonghe et al. |
| 4,917,974 A | 4/1990 | De Jonghe et al. |
| 5,162,175 A | 11/1992 | Visco et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,538,812 A | 7/1996 | Lee et al. |
| 5,601,947 A | 2/1997 | Skotheim et al. |
| 5,648,187 A | 7/1997 | Skotheim |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,117,590 A | 9/2000 | Skotheim et al. |
| 6,153,337 A | 11/2000 | Carlson et al. |
| 6,201,100 B1 | 3/2001 | Gorkovenko et al. |
| 6,238,821 B1 | 5/2001 | Mukherjee et al. |
| 6,306,545 B1 | 10/2001 | Carlson et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,688,075 B2 | 3/2010 | Kelley et al. |
| 7,771,870 B2 | 8/2010 | Affinito et al. |
| 7,785,730 B2 | 8/2010 | Affinito et al. |
| 7,939,198 B2 | 5/2011 | Mukherjee et al. |
| 8,076,024 B2 | 12/2011 | Affinito et al. |

(Continued)

FOREIGN PATENT DOCUMENTS

| | | |
|---|---|---|
| KR | 10-2008-0072340 A | 8/2008 |
| KR | 10-2014-0070160 A | 6/2014 |

(Continued)

OTHER PUBLICATIONS

Extended European Search Report for EP App. No. 17815995.0 dated Feb. 4, 2020.

(Continued)

*Primary Examiner* — Gregg Cantelmo
(74) *Attorney, Agent, or Firm* — Wolf, Greenfield & Sacks, P.C.

(57) ABSTRACT

Coatings for components of electrochemical cells (e.g., layers for protecting electrodes) are generally described. Associated compounds, articles, systems, and methods are also generally described.

20 Claims, 9 Drawing Sheets

(56) References Cited

U.S. PATENT DOCUMENTS

| | | |
|---|---|---|
| 8,084,102 B2 | 12/2011 | Affinito |
| 8,087,309 B2 | 1/2012 | Kelley et al. |
| 8,105,717 B2 | 1/2012 | Skotheim et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,397,342 B2 | 7/2016 | Skotheim et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,287 B2 | 12/2017 | Mikhaylik et al. |
| 9,947,963 B2 | 4/2018 | Du et al. |
| 9,994,959 B2 | 6/2018 | Laramie et al. |
| 9,994,960 B2 | 6/2018 | Laramie et al. |
| 10,020,479 B2 | 7/2018 | Mikhaylik et al. |
| 10,020,512 B2 | 7/2018 | Gronwald et al. |
| 10,050,308 B2 | 8/2018 | Liao et al. |
| 10,069,135 B2 | 9/2018 | Fleischmann et al. |
| 10,069,146 B2 | 9/2018 | Skotheim et al. |
| 10,122,043 B2 | 11/2018 | Du et al. |
| 2005/0196672 A1 | 9/2005 | Mukherjee et al. |
| 2006/0115579 A1 | 6/2006 | Mukherjee et al. |
| 2007/0221265 A1 | 9/2007 | Affinito et al. |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2010/0151332 A1 | 6/2010 | Lopez et al. |
| 2010/0239914 A1 | 9/2010 | Mikhaylik et al. |
| 2010/0327811 A1 | 12/2010 | Affinito et al. |
| 2011/0006738 A1 | 1/2011 | Mikhaylik et al. |
| 2011/0014524 A1 | 1/2011 | Skotheim et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0177388 A1 | 7/2011 | Bae et al. |
| 2011/0177398 A1 | 7/2011 | Affinito et al. |
| 2011/0206992 A1 | 8/2011 | Campbell et al. |
| 2011/0256450 A1 | 10/2011 | Campbell et al. |
| 2012/0048729 A1 | 3/2012 | Mikhaylik et al. |
| 2012/0052339 A1 | 3/2012 | Mikhaylik et al. |
| 2012/0052397 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2012/0276459 A1* | 11/2012 | Im .................. H01M 10/0566 429/405 |
| 2013/0115484 A1* | 5/2013 | Li .................. H01M 10/052 429/50 |
| 2013/0164635 A1 | 6/2013 | Schmidt et al. |
| 2013/0316072 A1 | 11/2013 | Scordilis-Kelley et al. |
| 2014/0062411 A1 | 3/2014 | Mikhaylik et al. |
| 2014/0079994 A1 | 3/2014 | Affinito et al. |
| 2014/0127419 A1 | 5/2014 | Fleischmann et al. |
| 2014/0127577 A1 | 5/2014 | Fleischmann et al. |
| 2014/0272565 A1 | 9/2014 | Gronwald et al. |
| 2014/0272594 A1 | 9/2014 | Safont et al. |
| 2014/0272595 A1 | 9/2014 | Cristadoro et al. |
| 2014/0272597 A1 | 9/2014 | Mikhaylik et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0140402 A1 | 5/2015 | Kim et al. |
| 2015/0162586 A1 | 6/2015 | Fleischmann et al. |
| 2015/0180037 A1 | 6/2015 | Gronwald et al. |
| 2015/0180084 A1 | 6/2015 | Scordilis-Kelley et al. |
| 2015/0188194 A1 | 7/2015 | Mikhaylik et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0287998 A1 | 10/2015 | Scordilis-Kelley et al. |
| 2015/0318539 A1 | 11/2015 | Kelley et al. |
| 2015/0349310 A1 | 12/2015 | Viner et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0301080 A1 | 10/2016 | Skotheim et al. |
| 2016/0344067 A1 | 11/2016 | Laramie et al. |
| 2017/0018815 A1 | 1/2017 | Laramie et al. |
| 2017/0047590 A1 | 2/2017 | Mikhaylik et al. |
| 2017/0141385 A1 | 5/2017 | Scordilis-Kelley et al. |
| 2017/0141402 A1 | 5/2017 | Affinito et al. |
| 2017/0141442 A1 | 5/2017 | Mikhaylik et al. |
| 2017/0149086 A1 | 5/2017 | Du et al. |
| 2017/0200975 A1 | 7/2017 | Liao et al. |
| 2017/0250390 A1 | 8/2017 | Laramie et al. |
| 2017/0288208 A1 | 10/2017 | Kelley et al. |
| 2017/0338475 A1 | 11/2017 | Laramie et al. |
| 2017/0352863 A1 | 12/2017 | Mikhaylik et al. |
| 2017/0373321 A1 | 12/2017 | Skotheim et al. |
| 2018/0006303 A1 | 1/2018 | Mikhaylik et al. |
| 2018/0034100 A1 | 2/2018 | Du et al. |
| 2018/0048018 A1 | 2/2018 | Scordilis-Kelley et al. |
| 2018/0138542 A1 | 5/2018 | Bunte et al. |
| 2018/0198162 A1 | 7/2018 | Du et al. |
| 2018/0230610 A1 | 8/2018 | Laramie et al. |
| 2018/0254516 A1 | 9/2018 | Han et al. |
| 2018/0261820 A1 | 9/2018 | Liao et al. |
| 2018/0269520 A1 | 9/2018 | Scordilis-Kelley et al. |
| 2018/0277850 A1 | 9/2018 | Quero-Mieres et al. |
| 2018/0287122 A1 | 10/2018 | Mikhaylik et al. |
| 2018/0301697 A1 | 10/2018 | Affinito et al. |
| 2018/0337406 A1 | 11/2018 | Mudalige et al. |
| 2018/0342766 A1 | 11/2018 | Du et al. |
| 2018/0351148 A1 | 12/2018 | Schneider et al. |
| 2018/0351158 A1 | 12/2018 | Liao et al. |
| 2018/0358651 A1 | 12/2018 | Liao et al. |
| 2018/0375155 A1 | 12/2018 | Liao et al. |
| 2019/0006699 A1 | 1/2019 | Jones et al. |

FOREIGN PATENT DOCUMENTS

| | | |
|---|---|---|
| WO | WO 99/33130 A1 | 7/1999 |
| WO | WO 00/36671 A1 | 6/2000 |
| WO | WO 2006/109930 A1 | 10/2006 |

OTHER PUBLICATIONS

International Search Report and Written Opinion for PCT/US2017/038103 dated Dec. 26, 2017.

(56) References Cited

OTHER PUBLICATIONS

Ahn et al., Improvement of the electrochemical properties of $SnO_2$ electrodes for lithium rechargeable battery using protective $Ta_2O_5$ thin films. Solid State Ionics. Feb. 2005;176(7-8):699-702.

Bortoluzzi et al., Convenient synthesis of fluoride-alkoxides of Nb(V) and Ta(V): a spectroscopic, crystallographic and computational study. Dalton Transactions. Sep. 2012;41:12898-906.

Dang et al., Lithium Insertion/Deinsertion Characteristics of Nanostructured Amorphous Tantalum Oxide Thin Films. ChemElectroChem. 2014;1:158-64.

Lu et al., Stable lithium electrodeposition in liquid and nanoporous solid electrolytes. Nature Materials. 2014;13:961-9.

Lu et al., Stable lithium electrodeposition in salt-reinforced electrolytes. Journal of Power Sources. Apr. 2015;279:413-8.

Prakash et al., Bromide Alkoxides of Tantalum. Journal für praktische Chemie. 1967;36(1-2):24-8.

\* cited by examiner

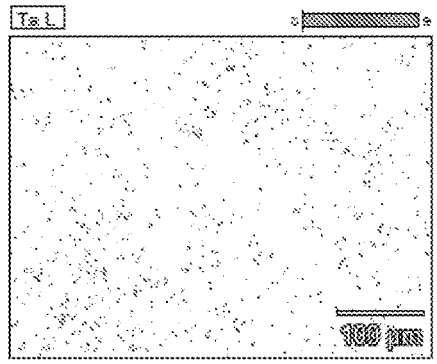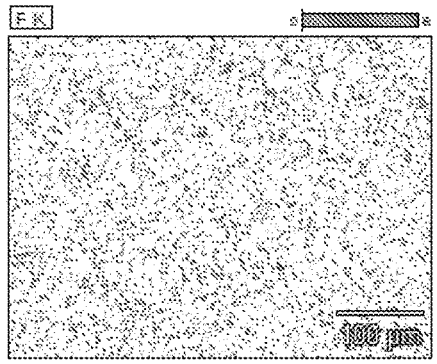
FIG. 7A                FIG. 7B
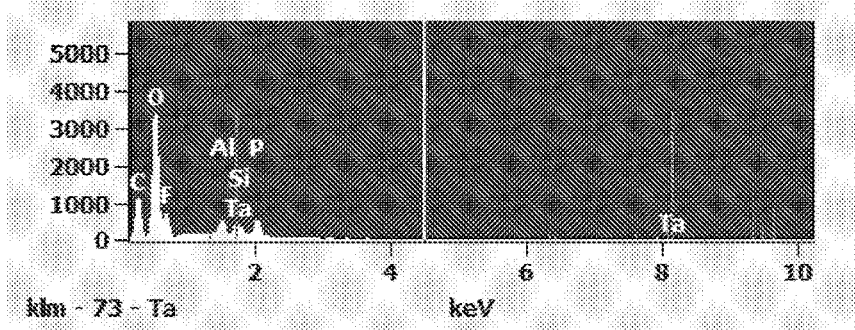
FIG. 7C

COATINGS FOR COMPONENTS OF ELECTROCHEMICAL CELLS

RELATED APPLICATIONS

This application is a national stage filing under 35 U.S.C. § 371 of international application number PCT/US2017/038103, filed Jun. 19, 2017, which was published under PCT Article 21(2) in English and claims the benefit under 35 U.S.C. § 119(e) of U.S. provisional application Ser. No. 62/352,654, filed Jun. 21, 2016, each of which is herein incorporated by reference in its entirety.

TECHNICAL FIELD

Coatings for components of electrochemical cells are generally described.

BACKGROUND

Coatings for components of electrochemical cells may be useful for a variety of purposes, such as for protective layers. Rechargeable and primary electrochemical cells oftentimes include one or more protective layers to protect the electroactive surface. Depending upon the specific protective layer(s), the protective layer(s) isolates the underlying electroactive surface from interactions with the electrolyte and/or other components within the electrochemical cell. Although techniques for forming protective layer(s) exist, methods that would allow formation of protective layer(s) that would improve the performance of an electrochemical cell and/or provide for simplified and/or more reliable and/or more economically efficient manufacturing processes would be beneficial.

SUMMARY

Coatings for components of electrochemical cells are generally described. In some embodiments, the articles described herein comprise a hybrid layer comprising inorganic material and an organic polymer positioned on a separator or other membrane. The article may be used for protecting an electrode. Associated compounds, systems, and methods are also generally described.

According to one or more embodiments, a series of compounds are provided. In one or more embodiments, a compound is provided having the formula $TaX_{5-y-z}(A)_y(OH)_z$, where, X=F, Br, Cl, or I; y=0 to 5, z=0 to 5, and y+z=1 to 5; and A=an oxygen-based anion.

According to one or more embodiments, a series of articles are provided. In one or more embodiments, an article is provided that comprises an electrode and a hybrid layer proximate a surface of the electrode. The electrode comprises lithium as an electroactive material. The hybrid layer comprises an inorganic material and an organic polymer and may further include a tantalum-containing compound.

In one or more embodiments, an article is provided that comprises a separator comprising pores. The article further comprises a tantalum-containing compound contained in at least a portion of the pores of the separator.

According to one or more embodiments, a series of methods are provided. In one or more embodiments, a method is performed in an electrochemical cell. The electrochemical cell comprises an electrode comprising lithium as an electroactive material. The electrode further comprises a surface. The electrochemical call further comprises a first layer proximate the surface of the electrode. The first layer comprises a tantalum fluoride-containing compound. The method comprises performing the step of charging the electrochemical cell to form a second layer comprising LiF, the second layer proximate the surface of the electrode.

In one or more embodiments, a provided method comprises forming a gel layer on a porous separator to form a coated separator. The gel layer comprises a crosslinked network of inorganic nanoparticles and organic polymer. The method further comprises applying a solution comprising a metal halide to the coated separator.

Specific features of aspects of the embodiments as defined above are illustrated or discussed herein below in more detail.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 7A and 7B are exemplary images of energy-dispersive X-ray spectroscopy (EDX) elemental mapping of the surface of a lithium anode;

FIG. 7C is an exemplary EDX spectrum of the surface of a lithium anode;

DETAILED DESCRIPTION

Figure 1:
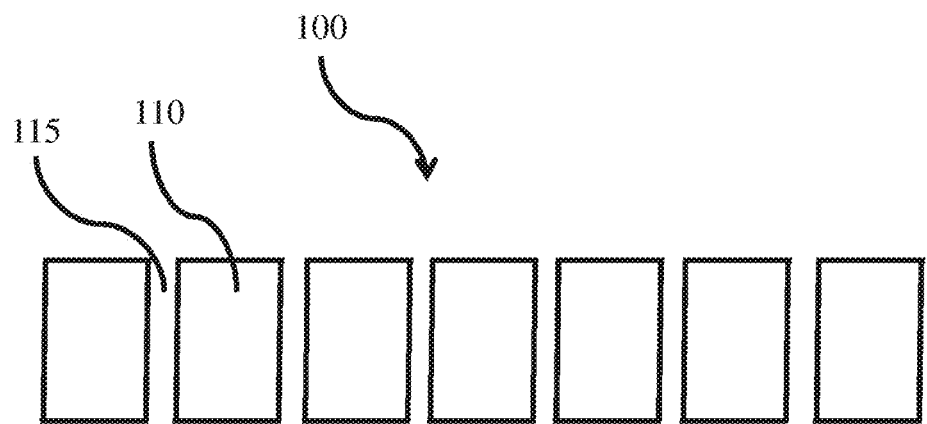
FIG. 1 is an exemplary schematic illustration of, according to some embodiments, a separator layer.

Coatings for components of electrochemical cells are generally described. In some embodiments, the articles described herein comprise a hybrid layer comprising inorganic material and an organic polymer positioned on a separator or other membrane. The article may be used for protecting an electrode. According to one or more embodiments, compositions for hybrid layers (e.g., layers comprising inorganic material and an organic polymer) useful as coatings in electrochemical cells and other applications are generally disclosed. According to one or more embodiments, methods for making the compositions and/or coatings are also generally disclosed. For example, articles comprising one or more layers formed through a sol-gel process are generally described.

According to one or more embodiments the disclosed articles may form or be assembled into an electrochemical cell. According to one or more embodiments, the article may comprise an electrode (e.g., an anode), in turn, comprising lithium as an electroactive material. The article may further comprise a layer proximate a surface of the electrode. The layer may comprise a hybrid layer comprising a metal-containing compound (e.g., a tantalum-containing compound.)

According to one or more embodiments, the disclosed article comprises a separator comprising pores. The article further comprises a metal-containing compound (e.g., tantalum-containing compound) contained in at least a portion of the pores of the separator.

According to one or more embodiments, a layer (e.g., hybrid layer) may be deposited on a separator layer for use as protective coating of an electrode (e.g., a lithium anode) in an electrochemical cell (e.g., that of a lithium or lithium-ion battery). According to one or more embodiments the disclosed layer may improve the safety characteristics of the electrochemical cell, and facilitate the use of beneficial materials in electrochemical cells, by reducing safety risks associated with those materials. For example, lithium metal has an extremely high theoretical specific capacity (3860 mAh/g), low density (0.59 g/cm$^3$) and the lowest negative electrochemical potential (−3.040 V vs. the standard hydrogen electrode). However, the utilization of lithium metal as an electrode in an electrochemical cell has been limited by safety hazards associated with potential internal short circuits caused by the growth of lithium dendrites during repeated charge/discharge processes.

According to one or more embodiments, coatings may be formed directly on a separator layer for use as protective layers of lithium anodes in lithium or lithium-ion batteries. The methods and coatings generally disclosed herein serve as alternatives to other approaches such as making coatings via vacuum deposition methods, such as sputtering, e-beam evaporation, etc.

According to one or more embodiments, the protective coating is an organic-inorganic hybrid coating comprising nanocomposite of organic polymer and inorganic ceramic nanoparticles with three-dimensional cross linking among them via chemical bonds. According to one or more embodiments, the coating is highly flexible and robust, and can tolerate the handling during cell assembly and the volume change during cell cycling without breaking up and/or detachment from the separator substrate.

According to one or more embodiments, the coating is partially infiltrated into the pores underneath the separator layer surface, improving adhesion with the separator layer substrate. According to one or more embodiments, the coating is porous, swellable, and is comprised of ionically conductive materials, therefore introducing relatively low impedance to the cell.

According to one or more embodiments, the methods for making the protective coatings are based on sol-gel processes. One or more steps of the sol-gel process may be carried out at a low temperature (for example, less than or equal to 80° C.). The processes may be performed without incorporating a vacuum, thus saving costs associated with vacuum methods. According to one or more embodiments, the formulation for the solution uses water as the solvent, which is inexpensive, abundantly available, and environmentally benign.

According to one or more embodiments, the coating method facilitates a reduction in the formation of defects such as pinholes and edge defects, compared to alternative methods, resulting in high reproducibility, and improved yield in cell production.

According to one or more embodiments, a disclosed method includes a step of applying a metal halide solution to the protective coating, thereby converting remaining hydroxyl (—OH) groups and water in the coating into chemical species that are not harmful to the cell performance, solving a long existing problem for incorporating sol-gel processes into methods for manufacturing electrochemical cells (e.g., lithium or lithium-ion batteries.)

According to one or more embodiments incorporating the use of a metal halide solution comprising $TaF_5$ during a process step, the step of applying the $TaF_5$ solution advantageously ultimately results in the incorporation of fluorine-containing species on a surface of an electrode. Such solutions serve as the source of fluorine in the solid form for the formation of a protective layer comprising lithium fluoride (LiF) on the surface of lithium anodes during the initial charging of the cells.

According to one or more embodiments incorporating the use of a metal halide solution comprising $TaBr_5$ during a process step, the step of applying the $TaBr_5$ solution advantageously results in the incorporation of bromide ions in the coatings. As a result bromide species are introduced into a solution within the electrochemical cell. Without being confined to a particular theory, it is believed that this process ultimately results in the formation of $Br_2/Br^-$ redox shuttles that inhibit lithium dendrite formation in a cell, and thus significantly extend the cycle life of a cell.

According to one or more embodiments, novel compounds and articles are disclosed.

According to one or more embodiments, a novel article may comprise a separator comprising pores; and a tantalum-containing compound contained in at least a portion of the pores of the separator.

FIG. 1 shows an exemplary separator 100, according to one or more embodiments. The separator 100 may comprise a polymeric material 110 and pores 115. The separator 100 may be a micro-porous separator. The separator may be fabricated from a variety of inorganic, organic, and naturally occurring materials and generally contain pores, which according to some embodiments are greater than 50-100 Å in diameter. In some embodiments, an exemplary separator layer is commercially available under the trademark "CELGARD.®" The separator 100 in FIG. 1 is shown prior to the application of one or more coatings (e.g., a hybrid layer) described below.

Figure 2:
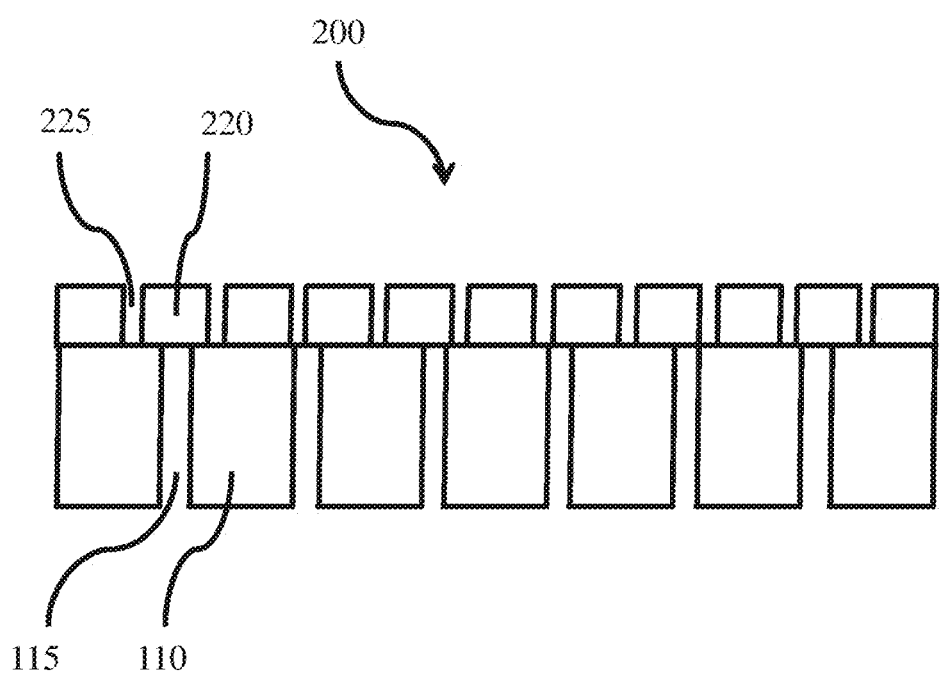
FIG. 2 is an exemplary schematic illustration of, according to some embodiments, a coated separator layer.

FIG. 2 shows an exemplary coated separator 200 after a first stage of formation, according to one or more embodiments. The coated separator 200 comprises a separator 100 as shown, for example, in FIG. 1 and a hybrid layer 220 which, according to some embodiments, may be formed through a sol-gel process. The hybrid layer 220 may comprise pores 225. The hybrid layer (also referred to as a coating layer) 220 may comprise one or more inorganic materials (e.g., inorganic nanoparticle species) and one or more organic polymer species, and, accordingly, may be referred to in this disclosure as a hybrid layer. In some embodiments, the inorganic material is in the form of particles, which are crosslinked to the organic polymer in the hybrid layer. The hybrid layer may form an organic-inorganic hybrid nanocomposite.

Figure 3:
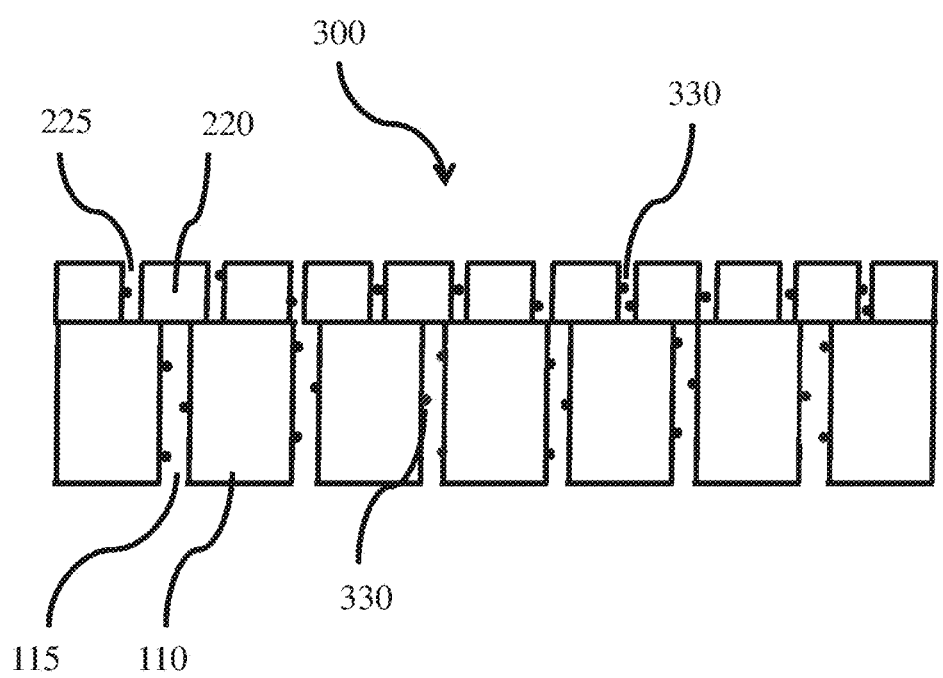
FIG. 3 is an exemplary schematic illustration of, according to some embodiments, a coated separator layer.

FIG. 3 shows an exemplary article 300. In some embodiments, the article 300 may comprise a coated separator after a second stage of formation. The article 300 comprises a separator 100 comprising material 110 (e.g., polymeric material) and pores 115. In the embodiment shown in FIG. 3, a hybrid layer (e.g., layer 220 of FIG. 2) has been modified to form a modified hybrid layer 220. The modified hybrid layer 220 may be positioned proximate to the separator 100. The modified hybrid layer 220 is a hybrid layer comprising an additional metal-containing compound (e.g., a tantalum-containing compound) 330. The metal-containing compound 330 (e.g., a tantalum-containing compound) may be positioned at different reactive sites in the layer 220. The layer 220 may also comprise pores 225. According to certain embodiments, methods for producing the modified hybrid layer 220 include a step of applying a metal halide solution to the hybrid layer, as discussed below. While not explicitly shown in FIG. 3, the hybrid layer 220 may also extend at least partially into pores 115 of the separator 100, according to certain embodiments. In some embodiments, this extension aids in increasing adhesion between the hybrid layer 220 and the separator 100. The metal-containing compound 330 (e.g., tantalum-containing compound) may additionally adhere to the separator 100 in porous portions 115 not coated by the hybrid layer 220.

According to certain embodiments, a novel tantalum-containing compound is disclosed having the chemical formula, $TaX_{5-y-z}(A)_y(OH)_z$, where, X=a halogen species; y=0 to 5, z=0 to 5, and y+z=1 to 5; and A=an oxygen-based anion. In some embodiments, the value of "z" may be zero. "A" may be an oxygen-based ligand species that serves as an electron donor. In some cases, "A" may be an enolate. In some embodiments, "A" may be a species selected from the group consisting of: an alkoxide having a carbon number of 1 to 8, acetylacetonate, 2-ethylhexyloxide, and acetate. In some embodiments, "A" may be $OCH_3$. As noted above, "X" is a halogen species. In some embodiments, "X" may be fluorine. In some embodiments, "X" may be bromine. Referring again to FIG. 3, the compound 330 may comprise one or more compounds having the above formulas.

According to certain embodiments, a tantalum-containing compound may bond to aluminum and oxygen (e.g., portions of a separator described herein) according to the chemical formula: $Al-O-TaX_{5-y-z}(A)_y(OH)_z$, where, X=a halogen species; y=0 to 5, z=0 to 5, and y+z=1 to 5; and A=an oxygen-based anion. In some embodiments, the value of "z" may be zero. "A" may be an oxygen-based ligand species that serves as an electron donor. "A" may be an enolate. In some embodiments, "A" may be a species selected from the group consisting of: an alkoxide having a carbon number of 1 to 8, acetylacetonate, 2-ethylhexyloxide, and acetate. In some embodiments, "A" may be $OCH_3$. As noted above, "X" is a halogen species. In some embodiments, "X" may be fluorine. In some embodiments, "X" may be bromine. Referring again to FIG. 3, the compound 330 may comprise one or more compounds having the above formulas.

Advantageously, each of the above two general compounds show reduced reactivity, for example, during the operation of an electrochemical cell, compared to alternative compounds, such as those that result from a sol-gel process where a metal halide application step is absent, all other factors being equal. The advantages of the above compounds include: (1) they are more stable to ambient moisture during the coating process; (2) once assembled inside an electrochemical cell, these derivatives may react with the anode (e.g., lithium anode) surface mildly or controllably. In contrast, in some alternative embodiments, in which the metal halide application step is absent, reactive compounds are present on the surface of a hybrid layer that may react violently or uncontrollably, resulting in prohibitively high impedance of the cell.

According to one or more embodiments, an article is disclosed that may constitute or be assembled into an electrochemical cell. The article may comprise an electrode. The electrode may comprise lithium as an electroactive material. In some embodiments, the electrode is an anode. The article may further comprise a layer proximate a surface of the electrode, such as a hybrid layer comprising an inorganic material and an organic polymer. The layer (e.g., hybrid layer) may comprise a tantalum-containing compound as described herein.

Figure 4:
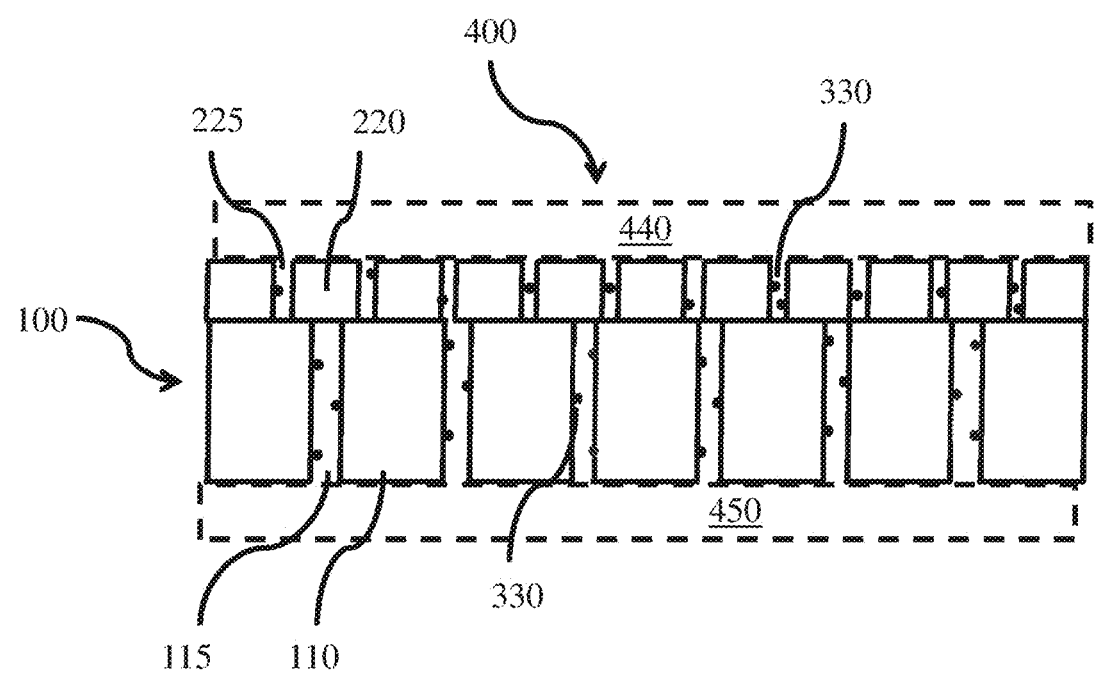
FIG. 4 is an exemplary schematic illustration of, according to some embodiments, an electrochemical cell comprising an enhanced coated separator.

For example, FIG. 4 shows an exemplary article 400. The article 400 may comprise an electrochemical cell. The article 400 may comprise a separator 100 comprising material 110 and pores 115. The article may comprise a hybrid layer 220 comprising a metal-containing compound 330 (e.g. tantalum-containing compound). The article may comprise a first electrode 440 and/or a second electrode 450. The first electrode 440 may be an anode. The second electrode 450 may be a cathode. The first electrode 440 and/or the second electrode 450 may comprise lithium as an electroactive material, according to one or more embodiments. The hybrid layer 220 may be proximate to a surface of the first electrode 440 and/or the second electrode 450. An electrolytic fluid may be in pores 115 of the separator or pores 225 of the hybrid layer 220.

According to one or more embodiments, methods of forming a hybrid layer coating on a substrate (e.g., porous separator) are generally disclosed. Furthermore, methods of forming a hybrid layer comprising a compound (e.g., a tantalum-containing compound) are generally disclosed. The substrate may be a separator designed for use in an electrochemical cell. The hybrid layer may serve as a protective coating. The method may comprise forming a hybrid layer coating on a porous separator, wherein the hybrid layer comprises a crosslinked network of inorganic nanoparticles and an organic polymer, to form a coated separator. A solution comprising a metal halide may be applied to the coated separator to form a modified or enhanced hybrid layer.

Forming the hybrid layer coating may comprise applying a precursor solution to the substrate (e.g., porous separator) and allowing the precursor solution to cure into a solid hybrid layer.

Figure 5:
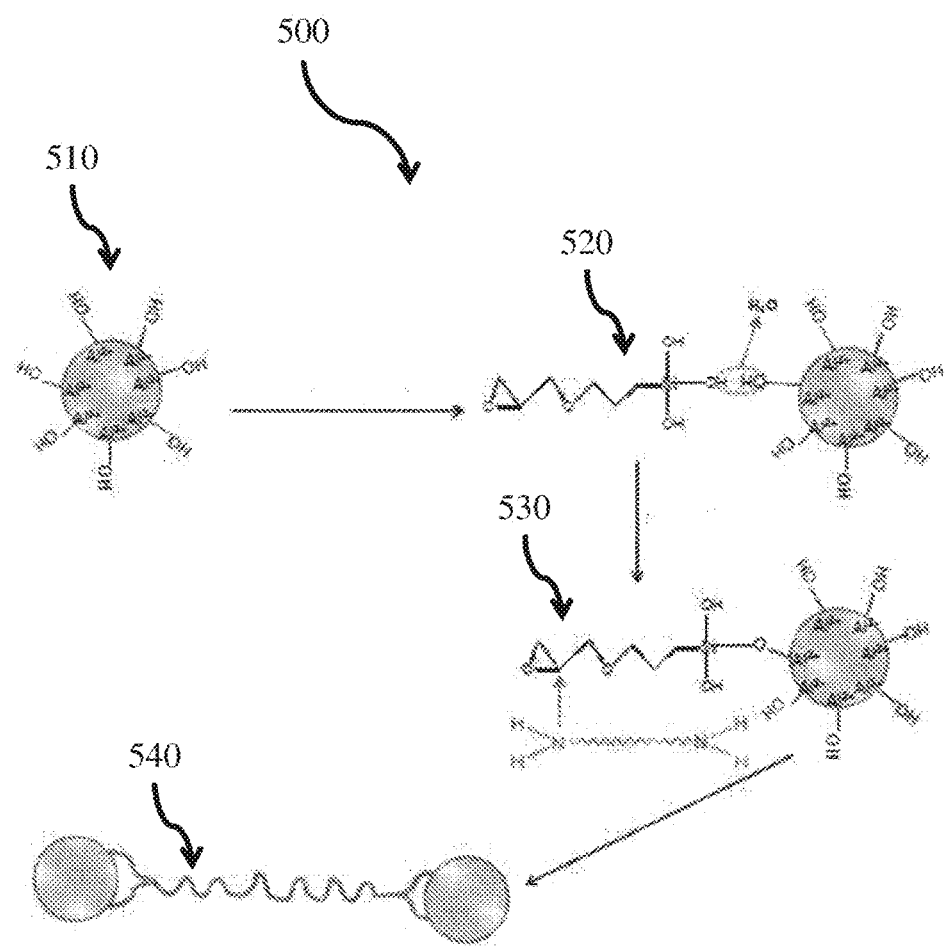
FIG. 5 is an exemplary process flow diagram of, according to some embodiments, the formulation of a precursor solution used to coat a separator.

For example, FIG. 5 shows a schematic process flow for a representative method 500 for forming a precursor solution comprising an inorganic material and an organic polymer and allowing the precursor solution to age to form a crosslinked network of inorganic nanoparticles and organic polymer. The precursor solution and/or resulting hybrid layer may be formed through a sol-gel process.

Regarding nomenclature, the coating material is generally referred to as a precursor solution prior to and during its application to the substrate (e.g., separator). The coating material is generally referred to as a gel layer after it has been applied to the substrate, but prior to curing. The coating material is generally referred to as a hybrid layer (a layer comprising an inorganic material and an organic polymer) after curing, where it is in a solid state. In embodiments where a metal halide solution is applied to the coating material, the enhanced material, after curing, is generally referred to as a hybrid layer comprising a tantalum-containing compound, where tantalum may be substituted for a different metal as discussed herein, or as a halogenated hybrid layer (e.g., fluorinated hybrid layer or brominated hybrid layer). The term hybrid layer may also refer to the coating material while still in a gel state. Transition to the various stages, from liquid to gel to solid, may occur on a continuum and therefore certain layers may have more than one physical state.

At step 510 of FIG. 5, a solution comprising a colloidal dispersion of inorganic nanoparticles (e.g., alumina nanoparticles) in a solvent (e.g., water) may be synthesized. While in some embodiments, the solvent may be water, other appropriate solvents may also be used (e.g., aqueous-based solvents).

The solution may comprise one or more species of inorganic nanoparticles. For example, the solution may comprise alumina nanoparticles, for example, AlO(OH). The alumina nanoparticles may have a particular crystalline phase (e.g., boehmite). Alternatively or additionally, the solution may comprise zirconium oxide ($ZrO_2$). The solution may comprise other materials, as well.

The inorganic nanoparticles may have an average largest cross-sectional dimension. In some embodiments the average largest cross-sectional dimension of the inorganic nanoparticles in solution may be about 14 nm. In some embodiments the average largest cross-sectional dimension may be less than or equal to 50 nm, less than or equal to 25 nm, less than or equal to 10 nm, less than or equal to 5 nm, or less than or equal to 1 nm. In some embodiments, the average largest cross-sectional dimension may be greater than 1 nm, greater than 5 nm, greater than 10 nm, or greater than 25 nm. Combinations of the above-noted ranges are also possible (e.g., an average largest cross-sectional dimension of less than or equal to 25 μm and greater than 10 nm). Other values are also possible.

The average largest cross-sectional dimension of the plurality of particles may be determined, for example, by imaging the particles with a scanning electron microscope (SEM). An image may be acquired at a magnification between about 10× to about 100,000×, depending on the overall dimensions of the plurality of particles. Those skilled in the art would be capable of selecting an appropriate magnification for imaging the sample. The average largest cross-sectional dimension of the plurality of particles can be determined by taking the longest cross-sectional dimension of each particle in the image and averaging the longest cross-sectional dimensions (e.g., averaging the longest cross-sectional dimensions for 50 particles).

The solution may have a particular concentration of inorganic nanoparticles. In some embodiments, the concentration of inorganic nanoparticles in the solution may be at least 10% and less than or equal to 80% by weight of the solution. For example, in some embodiments, the concentration of inorganic nanoparticles may be at least 10%, 20%, 30%, 40%, 50%, 60%, or 70%. In some embodiments, the concentration of inorganic nanoparticles may be less than or equal to 80%, 70%, 60%, 50%, 40%, 30%, or 20%. Combinations of the above-noted ranges are also possible (e.g., at least 30% and less than or equal to 50%). Other concentrations are also possible.

At step 520 a crosslinking agent is introduced into the colloidal solution. The crosslinking agent introduced to the colloidal solution may comprise pre-hydrolyzed glymo (glycidoxypropyl trimethoxysilane). Glymo is a bi-functional organosilane possessing a reactive organic epoxide and hydrolyzable inorganic methoxysilyl groups. The dual nature of its reactivity allows glymo to bind chemically to both inorganic materials and organic polymers, thus functioning as crosslinking agent. Alternatively or additionally, the crosslinking agent may comprise one of 3(Glycidyloxypropyl)triethoxysilane and 3-(Trimethoxysilyl)propyl methacrylate. Other bi-functional crosslinking agents may also be used.

The crosslinking agent may be introduced to the colloidal solution so that its concentration in the solution is, according to some embodiments, at least 0.01% and less than or equal to 20% by weight of the solution. For example, in some embodiments, the concentration of cross-linking agent may be at least 0.01%, 0.1%, 1%, 2%, 5%, 10%, or 15%. In some embodiments, the concentration of cross-linking agent may be less than or equal to 20%, 15%, 10%, 5%, 2%, 1%, or 0.1%. Combinations of the above-noted ranges are also possible (e.g., at least 1% and less than or equal to 2%). Other concentrations are also possible.

At step 530, the mixture is stirred. The mixture may be stirred for an appropriate amount of time to encourage bonding, for example, about 30 minutes. The resulting mixture may comprise crosslinking agent (e.g., Glymo) bonded to inorganic nanoparticles (e.g., aluminum nanoparticles).

At step 540, an organic polymer species is introduced to the mixture. In some embodiments, the organic polymer species may be a polyetheramine species. For example, the polymer species may be a compound commercially available under the trademark JEFFAMINE® ED 2003. JEFFAMINE ED series products are polyether diamines based on a predominantly polyethylene glycol (PEG) backbone. The polymer species may be water-soluble. Other components that may be additionally or alternatively added to the solution as a polymer species include, without limitation, polyvinyl alcohol (e.g., polyalkyl alcohols), polyethylene glycol (e.g., polyalkylene glycols), or polyethylene oxide (e.g., polyalkylene oxides).

The polymer species may be introduced to the solution so that its concentration in the solution is, according to some embodiments, at least 1% and less than or equal to 80% by weight of the solution. For example, in some embodiments, the concentration of polymer may be at least 1%, 10%, 20%, 30%, 50%, 60%, or 70%. In some embodiments, the concentration of polymer may be less than or equal to 80%, 70%, 60%, 50%, 30%, 20%, or 10%. Combinations of the above-noted ranges are also possible (e.g., at least 1% and less than or equal to 10%). Other concentrations are also possible.

After addition of the polymer species the solution may be stirred for a sufficient amount of time to facilitate cross-linking, for example, about 60 minutes.

The solution may then be allowed to age for a period of time. In some embodiments, the solution is allowed to age for about a day. As it ages, the solution forms a crosslinked network of inorganic nanoparticles and organic polymer.

The resulting solution (or precursor solution) may then be applied to a substrate (e.g., porous separator) to form a gel layer (which may later be cured to form a solid layer) as part of a process for forming a protective coating. For example, the substrate may be a separator like that shown in FIG. 1 and described above. The method may comprise forming a coating such as a gel layer on the porous separator, wherein the gel layer comprises inorganic nanoparticles and organic polymer. Crosslinking of the materials may result in a crosslinked network of inorganic nanoparticles and organic polymer to form a solid, coated separator. A solution comprising a metal halide may then be applied to the coated separator.

Figure 6:
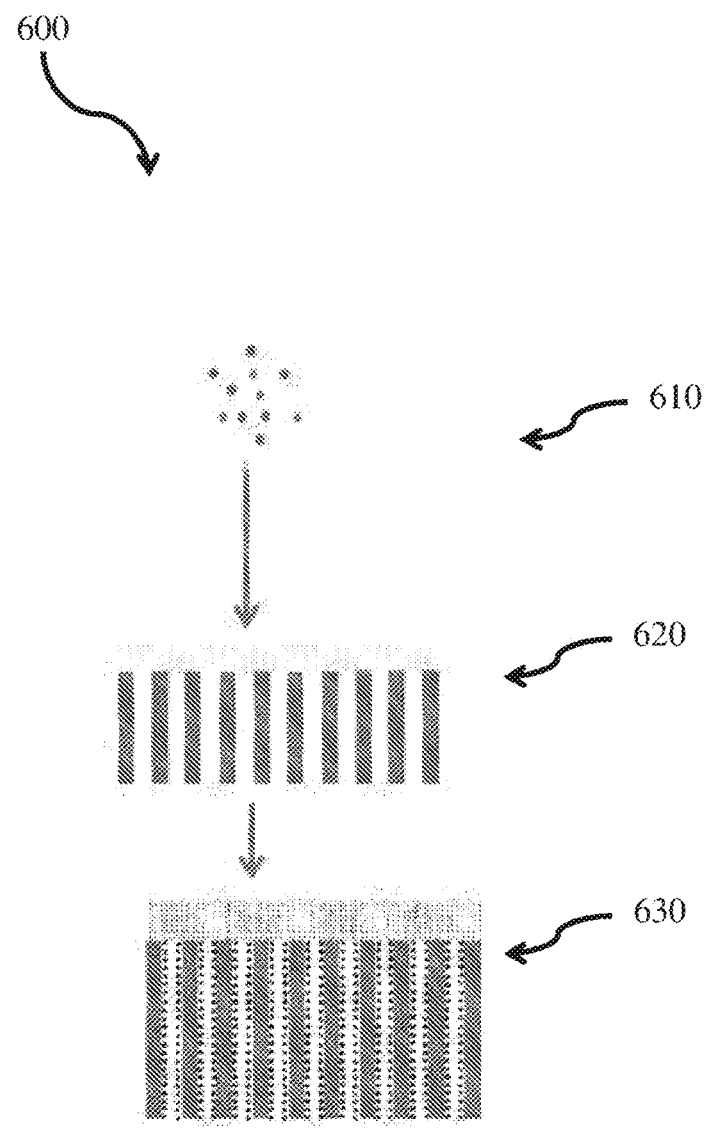
FIG. 6 is an exemplary process flow diagram of, according to some embodiments, the formation of an enhanced coated separator.

For example, FIG. 6 shows a process flow diagram for a representative method 600 for forming a gel layer on a separator, according to one or more embodiments.

At step 610, a precursor solution comprising a crosslinked network of inorganic nanoparticles and organic polymer may be synthesized through a sol-gel process, as discussed above in relation to FIG. 5.

At step 620, the solution formed at step 610 may be deposited onto a separator, forming a hybrid gel layer on the separator. The solution may be deposited onto the separator according to any of a number of methods, for example, through drop casting or through a doctor blade technique.

After the separator is coated with the solution, the coating may be allowed to dry for a sufficient period of time.

In certain embodiments, for example where the coating comprises alumina nanoparticles, the coating may possess a relatively high porosity so that chemical species can easily pass through it, and it possesses very high internal surface area which can serve as the sites for adsorption or chemical reactions.

According to some embodiments, a separator that is employed as the substrate may be heat-sensitive and therefore is generally not amenable to heating above a certain temperature without potentially suffering damage. In some embodiments, the coatings and/or the heat-sensitive nature of the separator does not allow the coated separator to be safely heated above a certain temperature, for example, about 80° C. As a result, in some embodiments there may still exist a significant amount of hydroxyl groups (—OH) and residual water in the coatings even after vacuum drying for an extended time. These remaining hydroxyl groups and residual water molecules are detrimental to the cycle life of a cell.

It was discovered within the context of this disclosure that residual hydroxyl groups and water could be removed from the coating (e.g., converted to different species) by applying a solution comprising a metal halide to the coated separator. The metal halide solution may be applied according to any technique known to a person of ordinary skill in the art. For example, the coated separator may be immersed in a metal halide solution; or, alternatively, the metal halide solution may be sprayed, brushed, wiped, etc. onto the coated separator. This finding provides for a number of advantages. For example, it allows for coatings to be applied to a separator through a sol-gel process, like that described above, which may be more economical and effective than other techniques. It allows for sol-gel processes to be used with separators that, while heat sensitive, are more effective and/or economical than alternative separators. Furthermore, additional advantages may also accrue from the application of a metal halide to the coated separator, for example, the formation of an advantageous species incorporated into a solution or into one or more layers of coatings on a separator during operation of an electrochemical cell, as further discussed below.

At step 630, a solution comprising a metal halide may be applied to the combined separator and layer (i.e., coated separator). The solution may be applied by immersing, fully or partially, the coated separator into the solution comprising a metal halide. Alternatively, the solution may be applied onto the coated separator by spraying, brushing, wiping, or other known techniques. In some embodiments, the metal halide solution may be gently agitated prior to or during application, to promote mixing.

In some embodiments, the solvent for the metal halide solution may comprise a suitable organic solvent, for example, anhydrous methanol. Other solvents such as other anhydrous alcohols may also be used. In some embodiments the metal component of the metal halide may comprise tantalum. Other metals that may be used (e.g., in the metal halide) include niobium, titanium, zirconium, hafnium, manganese, molybdenum, tungsten, tin, and antimony. In some embodiments, the halogen component may comprise fluorine or bromine. Other halogens that may be used include chlorine or iodine. In some embodiments the metal halide comprises a species having the formula $MX_5$, where M is a metal selected from the group consisting of Ta, Nb, Ti, Zr, Hf, Mn, Mo, W, Sn and Sb, and where X is a halogen selected from the group consisting of F, Br, Cl, and I. For example, the metal halide may comprise $TaF_5$ or $TaBr_5$. Other metal halide species may also be employed.

In some embodiments, the metal halide may have a particular concentration in the metal halide solution. The concentration of metal halide in the metal halide solution may be, according to some embodiments, at least 0.001 M and less than or equal to 2 M. For example, in some embodiments, the concentration of metal halide may be at least 0.001 M, 0.01 M, 0.1 M, 0.5 M, 1.0 M, 1.25 M, or 1.5 M. In some embodiments, the concentration of metal halide may be less than or equal to 2 M, 1.5 M, 1.25 M, 1.0 M, 0.5 M, 0.1 M, or 0.01 M. Combinations of the above-noted ranges are also possible (e.g., at least 0.1 M and less than or equal to 0.5 M). Other concentrations are also possible.

In some embodiments, where the coated separator is immersed into a metal halide solution, the samples may be immersed for a sufficient amount of time before being withdrawn from the solution, for example, one minute.

In some embodiments, the metal halide solution may be applied to the coated separator in a dry room environment.

After application of the metal halide solution to the coated separator, the enhanced coated separator may be allowed to dry for a certain amount of time.

The coated substrates (e.g., coated separators), after exposure to a metal halide, may then be loaded into a vacuum oven to cure. The temperature to which the oven is set may be based in part on the requirements of the separator substrate. For example, some substrates may be heat-sensitive therefore requiring that the oven be kept below a certain temperature. The oven may be set to sufficient temperature based on the requirements of the materials, for example, less than or equal to about 80° C., less than or equal to about 75° C., less than or equal to about 70° C., less than or equal to about 60° C., or less than or equal to about 50° C. The articles may be cured for a sufficient period of time, for example, 12 hours or 24 hours.

Without being bound to a particular theory, in embodiments in which the metal halide comprises tantalum and fluorine or bromine, it is believed that the following equations can be used to describe the reaction process from the starting compound, i.e., $TaX_5$:

$$TaX_5 + yCH_3OH \rightarrow TaX_{5-y}(OCH_3)_y + yHX,$$

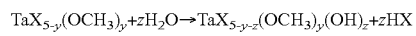

$$TaX_{5-y}(OCH_3)_y + zH_2O \rightarrow TaX_{5-y-z}(OCH_3)_y(OH)_z + zHX$$

where, X=F, Br, Cl, or I; y=0 to 5, z=0 to 5, and y+z=1 to 5

Similar formulas would apply for alternative metals to tantalum, or alternative halides, e.g., where Ta is replaced with a metal, M as described herein. Additionally, in other embodiments, CH$_3$OH may be replaced with a suitable alcohol that may result in the formation of an alkoxide having a carbon number of 1 to 8, as described herein.

By this stage, it is believed that a substantial portion of the remaining hydroxyl groups and water in the coatings has been fully converted through a series of non-hydrolytic sol-gel reactions.

After the coated separator has been allowed to dry it may be ready for use, for example, ready for incorporation into an electrochemical cell.

Through the above-described process a hybrid layer coating on the separator may be formed. The hybrid layer coating may comprise a crosslinked network of inorganic nanoparticles and organic polymer.

Without being bound to a particular theory, it is believed that the hybrid layer is partially infiltrated into the pores underneath the separator surface, facilitating a strong adhesion between the hybrid layer and the separator.

In operation, an electrochemical cell may go through a cycling process of discharging and charging. The act of charging in the presence of an anode comprising lithium may cause reactions that produce compounds in addition to the ones already described.

In some embodiments a layer comprising lithium tantalate (LiTaO$_3$) may be formed on a portion of the coated separator, e.g., during cycling of the cell. The method of forming such a layer may comprise exposing an effective amount of a compound comprising aluminum, oxygen and tantalum to an effective amount of lithium to form lithium tantalate.

According to certain embodiments, following a battery cycling, a lithium ion conductive material (e.g., LiTaO$_3$) may be formed. The lithium ion conductive material (e.g., LiTaO$_3$) may be chemically adsorbed on the surface of the AlO(OH) nanoparticles based on Al—O—Ta bonding.

Without being bound to a particular theory, the formation of lithium tantalate may comprise a three-step reaction process.

In step 1, amorphous Ta$_2$O$_5$ is formed due to hydrolysis, through the following reactions:

$$2TaX_{5-y}(OCH_3)_y+5H_2O \rightarrow Ta_2O_5+2yCH_3OH+(10-2y)HX$$

$$2TaX_{5-y}(OCH_3)_y(OH)_z+(5-2z)H_2O \rightarrow Ta_2O_5+2yCH_3OH+(10-2y-2z)HX,$$

where, X=F, Br, Cl, or I; y=0-5, z=0-5, and y+z=1-5.

In step 2, lithium oxide is formed due to electrochemical lithiation, through the following reaction:

$$Ta_2O_5+10Li^++10e^- \rightarrow 2Ta+5Li_2O.$$

In step 3, lithium tantalate (LiTaO$_3$) is formed, through the following reaction:

$$Li_2O+Ta_2O_5 \rightarrow 2LiTaO_3.$$

According to some embodiments, methods are disclosed for forming a layer comprising lithium fluoride (LiF). The method may be performed in an electrochemical cell. The electrochemical cell may comprise an electrode, with the electrode, in turn, comprising lithium as an electroactive material. The electrode may further comprise a surface. The electrochemical cell may further comprise a first layer proximate (e.g., adjacent or directly adjacent) the surface of the electrode. The first layer may comprise a tantalum fluoride-containing compound. The method may comprise cycling (e.g., charging and/or discharging) the electrochemical cell to form a second layer comprising lithium fluoride. The second layer may be proximate the surface of the electrode.

In some embodiments, the layer comprising lithium fluoride passivates the surface of the electrode (e.g., the surface of a lithium metal layer). The lithium fluoride layer may effectively protect the lithium anode against dendrite formation.

As described herein, after application of a metal fluoride solution to the coated separator, a significant amount of fluorine-containing species are loaded into the coating layer. The amount of fluoride loading may be controlled by adjusting the concentration of the solution, and/or the dwell time of immersion. The high porosity and internal surface area of the coating facilitates the fluoride loading by providing a large number of sites for potential adsorption and/or chemical reactions. The presence of the fluoride may result in a layer of lithium fluoride being formed on the surface of the electrode (e.g., lithium anode), e.g., upon the initial charging of the cell and/or during cycling of the cell.

The formation of LiF may be due to electrochemical lithiation, according to the following reaction:

$$TaF_{5-x}(OCH_3)_x+5Li^++5e^- \rightarrow Ta+(5-x)LiF+xCH_3OLi$$

where x=0 to 4.

In some embodiments where the halogen species of the applied metal halide solution is bromine (e.g., TaBr$_5$), a solution comprising lithium bromide may be formed, during operation (e.g., cycling) of the cell. The lithium bromide solution may aid in protecting the lithium anode by functioning as a redox shuttle, an electrolyte additive that can serve as an overcharge protection mechanism to enhance the safety characteristics of lithium-ion batteries. The Br$_2$/Br$^-$ redox shuttles may inhibit or reduce the formation of lithium dendrites in a cell, and extend the cycle life of a cell. Meanwhile, the protective layer (e.g., hybrid layer coating the separator) adjacent the lithium anode may block a substantial portion or substantially all of the redox shuttles from permeating through to the lithium anode, which facilitates improved cycling efficiency.

According to some embodiments, the disclosed separator may comprise polymeric material. As described herein, a free-standing, porous, separator layer may be used as the polymer matrix on which a hybrid layer is deposited. The porous separator layer may be conductive or non-conductive to ions. The hole pathways through the layer can be quite tortuous in some embodiments. In certain embodiments, the hole pathways through the layer pass completely through the layer. This free standing layer can then be coated with a hybrid layer.

In some embodiments involving the electrochemical cells described above and herein, the separator is ionically conductive, the average ionic conductivity of the separator being preferably at least 10$^{-7}$ S/cm at 25 degrees Celsius. Conductivity (e.g., dry conductivity) may be measured at room temperature (e.g., 25 degrees Celsius), for example, using a conductivity bridge (i.e., an impedance measuring circuit) operating at 1 kHz in the absence of an electrolyte and/or solvent (i.e., for a dry separator). The separator may have a bulk electronic resistivity of at least about 10$^4$ Ohm-meters at 25 degrees Celsius. Other ranges for average ionic conductivity and bulk electronic resistivity are described in more detail below.

In some embodiments involving the electrochemical cells described above and herein, the separator and the hybrid layer contacting the separator constitute a composite, the composite preferably having a thickness of 5 microns to 40 microns. The composite may be, in some embodiments, a free-standing structure. Other thicknesses are described in more detail below.

In some embodiments involving the electrochemical cells described above and herein, the strength of adhesion between the separator and the hybrid layer contacting the separator is at least 350 N/m. Other ranges or adhesion are described in more detail below.

Materials such as nonwoven fibers (e.g. nylon, cotton, polyesters, glass), polymer films (e.g. polyethylene (PE), polypropylene (PP), poly(tetrafluoroethylene) (PTFE), poly(vinyl chloride) (PVC)), and naturally occurring substances (e.g. rubber, asbestos, wood) may be used for microporous separators in batteries that operate at ambient and low temperatures (<100° C.). The micro-porous polyolefins (PP, PE, or laminates of PP and PE) (e.g., Celgard 2325) may be used in lithium based non-aqueous batteries.

A separator as described herein can be made of a variety of materials. The separator may be polymeric in some instances, or formed of an inorganic material (e.g., glass fiber filter papers) in other instances. Examples of suitable separator materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

The mechanical and electronic properties (e.g., conductivity, resistivity) of these polymers are known. Accordingly, those of ordinary skill in the art can choose suitable materials based on their mechanical and/or electronic properties (e.g., ionic and/or electronic conductivity/resistivity), and/or can modify such polymers to be ionically conducting (e.g., conductive towards single ions) based on knowledge in the art, in combination with the description herein. For example, the polymer materials listed above and herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity, if desired.

In certain embodiments, a separator may comprise a mixture of a polymeric binder and a filler comprising a ceramic or a glassy/ceramic material.

Further examples of separators and separator materials suitable for use include those comprising a microporous xerogel layer, for example, a microporous pseudo-boehmite layer, which may be provided either as a free standing film or by a direct coating application on one of the electrodes, as described in U.S. Pat. No. 6,153,337, filed Dec. 19, 1997 and, entitled "Separators for electrochemical cells," and U.S. Pat. No. 6,306,545 filed Dec. 17, 1998 and entitled "Separators for electrochemical cells." Solid electrolytes and gel electrolytes may also function as a separator in addition to their electrolyte function. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Other suitable materials that could be used to form all or part of the separator include the separator materials described in U.S. Patent Publication No. 2010/0327811, filed Jul. 1, 2010 and published Dec. 30, 2010, entitled "Electrode Protection in Both Aqueous and Non-Aqueous Electromechanical Cells, Including Rechargeable Lithium Batteries," which is incorporated herein by reference in its entirety for all purposes.

Those of ordinary skill in the art, given the present disclosure, would be capable of selecting appropriate materials for use as the separator. Relevant factors that might be considered when making such selections include the ionic conductivity of the separator material; the ability to deposit or otherwise form the separator material on or with other materials in the electrochemical cell; the flexibility of the separator material; the porosity of the separator material (e.g., overall porosity, average pore size, pore size distribution, and/or tortuosity); the compatibility of the separator material with the fabrication process used to form the electrochemical cell; the compatibility of the separator material with the electrolyte of the electrochemical cell; and/or the ability to adhere the separator material to the gel material. In certain embodiments, the separator material can be selected based on its ability to survive gel deposition processes without mechanically failing.

Those of ordinary skill in the art can employ a simple screening test to select an appropriate separator material from candidate materials. One simple screening test involves positioning a material as a separator in an electrochemical cell which, to function, requires passage of an ionic species across the material (e.g., through pores of the material) while maintaining electronic separation. If the material is substantially ionically conductive in this test, then electrical current will be generated upon discharging the electrochemical cell. A screening test may also involve testing the adhesion between the separator and a hybrid layer as described herein. Another screening test may involve testing the ability of the separator to not swell in the presence of an electrolyte to be used in an electrochemical cell. Other simple tests can be conducted by those of ordinary skill in the art.

The separator can be configured to inhibit (e.g., prevent) physical contact between a first electrode and a second electrode, which could result in short circuiting of the electrochemical cell. The separator can be configured to be substantially electronically non-conductive, which can inhibit the degree to which the separator causes short circuiting of the electrochemical cell. In certain embodiments, all or portions of the separator can be formed of a material with a bulk electronic resistivity of at least about $10^4$, at least about $10^5$, at least about $10^{10}$, at least about $10^{15}$, or at least about $10^{20}$ Ohm-meters. Bulk electronic resistivity may be measured at room temperature (e.g., 25 degrees Celsius).

In some embodiments, the separator can be ionically conductive, while in other embodiments, the separator is substantially ionically non-conductive. In some embodiments, the average ionic conductivity of the separator is at least about $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm. In certain embodiments, the average ionic conductivity of the separator may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible (e.g., an average ionic conductivity of at least about $10^{-8}$ S/cm and less than or equal to about $10^{-1}$ S/cm). Conductivity (e.g., dry conductivity) may be measured at room temperature (e.g., 25 degrees Celsius), for example, using a conductivity bridge (i.e., an impedance measuring circuit) operating at 1 kHz in the absence of an electrolyte and/or solvent (i.e., for a dry separator).

In some embodiments, the separator can be a solid. The separator may be porous to allow an electrolyte solvent to pass through it. In some cases, the separator does not substantially include a solvent (like in a gel), except for solvent that may pass through or reside in the pores of the separator.

The thickness of the separator may vary. The thickness of the separator may vary over a range from, for example, 5 microns to 40 microns. For instance, the thickness of the separator may be between 10-20 microns, between 20-30 microns, or between 20-40 microns. The thickness of the separator may be less than or equal to, e.g., 40 microns, less than or equal to 30 microns, less than or equal to 25 microns, less than or equal to 10 microns, or less than or equal to 9 microns. In some embodiments, the separator is at least 9 microns thick, at least 10 microns thick, at least 20 microns thick, at least 25 microns thick, at least 30 microns thick, or at least 40 microns thick. Other thicknesses are also possible. Combinations of the above-noted ranges are also possible.

As described herein, a separator may have a smooth surface. In some embodiments, the RMS surface roughness of a separator may be, for example, less than 1 μm. In certain embodiments, the RMS surface roughness for such surfaces may be, for example, between 0.5 nm and 1 μm (e.g., between 0.5 nm and 10 nm, between 10 nm and 50 nm, between 10 nm and 100 nm, between 50 nm and 200 nm, between 10 nm and 500 nm). In some embodiments, the RMS surface roughness may be less than or equal to 0.9 μm, less than or equal to 0.8 μm, less than or equal to 0.7 μm, less than or equal to 0.6 μm, less than or equal to 0.5 μm, less than or equal to 0.4 μm, less than or equal to 0.3 μm, less than or equal to 0.2 μm, less than or equal to 0.1 μm, less than or equal to 75 nm, less than or equal to 50 nm, less than or equal to 25 nm, less than or equal to 10 nm, less than or equal to 5 nm, less than or equal to 2 nm, less than or equal to 1 nm. In some embodiments, the RMS surface roughness may be greater than 1 nm, greater than 5 nm, greater than 10 nm, greater than 50 nm, greater than 100 nm, greater than 200 nm, greater than 500 nm, or greater than 700 nm. Combinations of the above-noted ranges are also possible (e.g., a RMS surface roughness of less than or equal to 0.5 μm and greater than 10 nm). Other values are also possible.

As described herein, the separator may be porous. In some embodiments, the average pore diameter (or largest pore diameter) of the separator may be, for example, less than 5 microns. In certain embodiments, the average pore diameter (or largest pore diameter) of the separator may be between 50 nm and 5 microns, between 50 nm and 500 nm, between 100 nm and 300 nm, between 300 nm and 1 micron, between 500 nm and 5 microns. In some embodiments, the average pore diameter (or largest pore diameter) may be less than or equal to 5 microns, less than or equal to 1 micron, less than or equal to 500 nm, less than or equal to 300 nm, less than or equal to 100 nm, or less than or equal to 50 nm. In some embodiments, the average pore diameter (or largest pore diameter) may be greater than 50 nm, greater than 100 nm, greater than 300 nm, greater than 500 nm, or greater than 1 micron. Other values are also possible. Combinations of the above-noted ranges are also possible (e.g., less than 300 nm and greater than 100 nm).

In certain embodiments, an electrochemical cell comprises a first electrode comprising an electroactive material, a second electrode and a composite positioned between the first and second electrodes. The composite comprises a separator comprising pores having an average pore size and a hybrid layer bonded to the separator. The separator may have a bulk electronic resistivity of at least $10^4$ Ohm meters (e.g., at least $10^{10}$ Ohm meters, or at least $10^{15}$ Ohm meters, e.g., between $10^{10}$ Ohm meters to $10^{15}$ Ohm meters). The hybrid layer has a lithium-ion conductivity of at least at least $10^{-6}$ S/cm, and comprises a lithium oxysulfide having an oxide content between 0.1-20 wt %.

In some embodiments, an exemplary separator layer is commercially available under the trademark CELGARD®. CELGARD® 2500 has a porosity of 55% and average pore size of 64 nm in diameter.

In some embodiments, the average ionic conductivity (e.g., lithium ion conductivity) of the hybrid layer material (e.g., a coating on a separator as described herein) is at least about $10^{-7}$ S/cm, at least about $10^{-6}$ S/cm, or at least about $10^{-5}$ S/cm. The average ionic conductivity may less than or equal to about $10^{-4}$ S/cm, less than or equal to about $10^{-5}$ S/cm, or less than or equal to $10^{-6}$ S/cm. Conductivity may be measured at room temperature (e.g., 25 degrees Celsius) when the hybrid layer is in a dry state. Conductivity (e.g., dry conductivity) may be measured at room temperature (e.g., 25 degrees Celsius), for example, using a conductivity bridge (i.e., an impedance measuring circuit) operating at 1 kHz in the absence of an electrolyte and/or solvent.

In some embodiments involving the electrochemical cells described above and herein, a strength of adhesion between the separator and the hybrid layer is at least 350 N/m, at least 500 N/m, or another range as described in more detail below. In some instances, a strength of adhesion between the separator and the hybrid layer passes the tape test according to the standard ASTM D3359-02. As described herein, in some embodiments involving the formation of a protective structure by depositing a precursor solution on the surface of a separator layer, it is desirable to increase the bonding or adhesive strength between the hybrid layer and the separator layer. As a result of increased adhesion between the layers, the likelihood of delamination of the layers can be reduced and the mechanical stability of the hybrid layer can be improved during cycling of the cell. For example, the resulting composite can enhance the hybrid layer's ability to withstand the mechanical stresses encountered when it is placed in a pressurized cell.

To determine relative adhesion strength between two layers, a tape test can be performed. Briefly, the tape test utilizes pressure-sensitive tape to qualitatively assess the adhesion between a first layer (e.g., a separator layer) and a second layer (e.g., a ion conducting layer). In such a test, an X-cut can be made through the first layer (e.g., separator layer) to the second layer (e.g., hybrid layer). Pressure-sensitive tape can be applied over the cut area and removed. If the separator layer stays on the ion conducting layer (or vice versa), adhesion is good. If the separator layer comes off with the strip of tape, adhesion is poor. The tape test may be performed according to the standard ASTM D3359-02. In some embodiments, a strength of adhesion between the separator and the hybrid layer passes the tape test according to the standard ASTM D3359-02, meaning the hybrid layer does not delaminate from the separator layer during the test. In some embodiments, the tape test is performed after the two layers (e.g., a first layer such as a separator layer, to a second layer such as a hybrid layer) have been included in a cell, such as a lithium-sulfur cell or any other appropriate cell described herein, that has been cycled at least 5 times, at least 10 times, at least 15 times, at least 20 times, at least 50 times, or at least 100 times, and the two layers pass the tape test after being removed from the cell (e.g., the first layer does not delaminate from the second layer during the test).

The peel test may include measuring the adhesiveness or force required to remove a first layer (e.g., a separator layer) from a unit length of a second layer (e.g., a hybrid layer), which can be measured in N/m, using a tensile testing apparatus or another suitable apparatus. Such experiments can optionally be performed in the presence of a solvent (e.g., an electrolyte) or other components to determine the influence of the solvent and/or components on adhesion.

In some embodiments, the strength of adhesion between two layers (e.g., a first layer such as a separator layer and a second layer such as a hybrid layer) may range, for example, between 100 N/m to 2000 N/m. In certain embodiments, the strength of adhesion may be at least 50 N/m, at least 100 N/m, at least 200 N/m, at least 350 N/m, at least 500 N/m, at least 700 N/m, at least 900 N/m, at least 1000 N/m, at least 1200 N/m, at least 1400 N/m, at least 1600 N/m, or at least 1800 N/m. In certain embodiments, the strength of adhesion may be less than or equal to 2000 N/m, less than or equal to 1500 N/m, less than or equal to 1000 N/m, less than or equal to 900 N/m, less than or equal to 700 N/m, less than or equal to 500 N/m, less than or equal to 350 N/m, less than or equal to 200 N/m, less than or equal to 100 N/m, or less than or equal to 50 N/m. Other strengths of adhesion are also possible.

The thickness of the hybrid layer may vary. The thickness of the hybrid layer may vary over a range from, for example, 1 nm to 7 microns. For instance, the thickness of the hybrid layer may be between 1-10 nm, between 10-100 nm, between 10-50 nm, between 30-70 nm, between 100-1000 nm, or between 1-7 microns. The thickness of a hybrid layer may, for example, be less than or equal to 7 microns, less than or equal to 5 microns, less than or equal to 2 microns, less than or equal to 1000 nm, less than or equal to 600 nm, less than or equal to 500 nm, less than or equal to 250 nm, less than or equal to 100 nm, less than or equal to 70 nm, less than or equal to 50 nm, less than or equal to 25 nm, or less than or equal to 10 nm. In some embodiments, a hybrid layer is at least 10 nm thick, at least 20 nm thick, at least 30 nm thick, at least 100 nm thick, at least 400 nm thick, at least 1 micron thick, at least 2.5 microns thick, or at least 5 microns thick. Other thicknesses are also possible. Combinations of the above-noted ranges are also possible.

As described herein, the relative thickness of the hybrid layer to the average pore diameter of the separator, which is positioned adjacent the hybrid layer, may influence the degree of adhesive strength of the two layers. For instance, the thickness of the hybrid layer may be greater than the average pore diameter (or largest pore diameter) of separator. In certain embodiments, the average thickness of the hybrid layer is at least 1.1 times, at least 1.2 times, at least 1.5 times, at least 1.7 times, at least 2 times, at least 2.5 times, at least 2.7 times, at least 2.8 times, at least 3.0 times, at least 3.2 times, at least 3.5 times, at least 3.8 times, at least 4.0 times, at least 5.0 times, at least 7.0 times, at least 10.0 times, or at least 20.0 times the average pore diameter (or the largest pore diameter) of the separator adjacent the hybrid layer. In certain embodiments, the average thickness of the hybrid layer may be less than or equal to 20.0 times, less than or equal to 10.0 times, less than or equal to 7.0 times, less than or equal to 5.0 times, less than or equal to 4.0 times, less than or equal to 3.8 times, less than or equal to 3.5 times, less than or equal to 3.2 times, less than or equal to 3.0 times, less than or equal to 2.8 times, less than or equal to 2.5 times, or less than or equal to 2 times the average pore diameter (or the largest pore diameter) of the separator adjacent the hybrid layer. Other combinations of average pore diameter and hybrid layer thicknesses are also possible.

The ratio of thickness of the hybrid layer to average pore diameter of the separator may be, for example, at least 1:1 (e.g., 1.1:1), at least 2:1, at least 3:2, at least 3:1, at least 4:1, at least 5:1, or at least 10:1. The ratio of thickness of the hybrid layer to average pore diameter of the separator may be less than or equal to 10:1, less than or equal to 5:1, less than or equal to 3:1, less than or equal to 2:1 (e.g., 1.1:1), or less than or equal to 1:1. Other ratios are also possible. Combinations of the above-noted ranges are also possible.

In some embodiments, in an electrochemical cell, the hybrid layer may serve as a solvent barrier which acts to prevent or reduce the likelihood of a liquid electrolyte from interacting with an electroactive material (e.g., lithium metal). In some embodiments, the ability of the composite hybrid layer-separator to act as a barrier can be measured in part by an air permeation test (e.g., the Gurley Test). The Gurley Test determines the time required for a specific volume of air to flow through a standard area of the material. As such, larger air permeation times (Gurley-sec) generally correspond to better barrier properties.

In some embodiments, air permeation times of a composite described herein (e.g., a hybrid layer-separator composite) may be at least 1,000 Gurley-s, at least 5,000 Gurley-s, at least 10,000 Gurley-s, at least 20,000 Gurley-s, at least 40,000 Gurley-s, at least 60,000 Gurley-s, at least 80,000 Gurley-s, at least 100,000 Gurley-s, at least 120,000 Gurley-s, at least 140,000 Gurley-s, at least 160,000 Gurley-s, at least 180,000 Gurley-s, at least 200,000 Gurley-s, at least 500,000 Gurley-s, or at least $10^6$ Gurley-s. In some embodiments, the composite is substantially impermeable. In some embodiments, the air permeation time may be less than or equal to $10^6$ Gurley-s, less than or equal to 500,000 Gurley-s, less than or equal to 200,000 Gurley-s, less than or equal to 150,000 Gurley-s, less than or equal to 120,000 Gurley-s, less than or equal to 80,000 Gurley-s, less than or equal to 40,000 Gurley-s, less than or equal to 20,000 Gurley-s, less than or equal to 10,000 Gurley-s, or less than or equal to 5,000 Gurley-s. The air permeation times and Gurley tests described herein refer to those performed according to TAPPI Standard T 536 om-12, which involves a pressure differential of 3 kPa and a sample size of a square inch.

As described herein, various methods may be used to form hybrid layer/separator composite. The thickness of the composite may vary over a range from, for example, 5 microns to 40 microns. For instance, the thickness of the composite may be between 10-20 microns, between 20-30 microns, or between 20-40 microns. The thickness of the composite may be, for example, less than or equal to 40 microns, less than or equal to 30 microns, less than or equal to 25 microns, less than or equal to 10 microns, less than or equal to 9 microns, or less than or equal to 7 microns. In some embodiments, the composite is at least 5 microns thick, at least 7 microns thick, at least 9 microns thick, at least 10 microns thick, at least 20 microns thick, at least 25 microns thick, at least 30 microns thick, or at least 40 microns thick. Other thicknesses are also possible. Combinations of the above-noted ranges are also possible.

The porosity of the hybrid layer may vary over a range from, for example, 10% to 30% by volume. The porosity of the hybrid layer may be, for example, less than or equal to 30%, less than or equal to 25%, less than or equal to 20%, less than or equal to 15%. In some embodiments, porosity of the hybrid layer is at least 10%, at least 15%, at least 20%, or at least 25%. Other porosities are also possible. Combinations of the above-noted ranges are also possible.

Average porosity can be measured, for example, using a mercury porosimeter. Briefly, average porosity can be determined by measuring the external pressure required to force a liquid (e.g., mercury) into a pore (e.g., against the opposing force of surface tension between the liquid and the pore). Those skilled in the art would be capable of selecting an appropriate range of external pressures based upon the particles selected.

The average pore diameter (or largest pore diameter) within the hybrid layer may vary over a range from, for example, 1 nm to 20 nm. The average pore diameter (or largest pore diameter) within the hybrid layer may be, for example, less than or equal to 20 nm, less than or equal to 15 nm, less than or equal to 10 nm, or less than or equal to 5 nm. In some embodiments, The average pore diameter (or largest pore diameter) within the hybrid layer is at least 1 nm, at least 5 nm, at least 10 nm, or at least 15 nm. Other average pore size values are also possible. Combinations of the above-noted ranges are also possible.

A composite structure described herein including a hybrid layer and a separator may be a free-standing structure that may be packaged alone (optionally with suitable components such as a substrate for handling), or together with an electroactive material to form a protected electrode, or assembled into an electrochemical cell.

Although the composites described herein may be used in various electrochemical cells, in one set of embodiments, the composite is included in a lithium cell, such as a lithium-sulfur cell. Accordingly, a first electrode may comprise lithium, such as lithium metal and/or a lithium alloy, as a first electroactive material, and a second electrode comprises sulfur as a second electroactive material.

In some embodiments involving the electrochemical cells described above and herein, the first electroactive material comprises lithium; e.g., the first electroactive material may comprise lithium metal and/or a lithium alloy.

It should be understood that, everywhere in which lithium is described as an electroactive material, other suitable electroactive materials (including others described elsewhere herein) could be substituted.

In some embodiments, an electrode, such as a first electrode (e.g., electrode 440 in FIG. 4) comprises an electroactive material comprising lithium. Suitable electroactive materials comprising lithium include, but are not limited to, lithium metal (such as lithium foil and/or lithium deposited onto a conductive substrate) and lithium metal alloys (e.g., lithium-aluminum alloys and lithium-tin alloys). In some embodiments, the electroactive lithium-containing material of an electrode comprises greater than 50 wt % lithium. In some cases, the electroactive lithium-containing material of an electrode comprises greater than 75 wt % lithium. In still other embodiments, the electroactive lithium-containing material of an electrode comprises greater than 90 wt % lithium. Other examples of electroactive materials that can be used (e.g., in the first electrode, which can be a negative electrode) include, but are not limited to, other alkali metals (e.g., sodium, potassium, rubidium, cesium, francium), alkaline earth metals (e.g., beryllium, magnesium, calcium, strontium, barium, radium), and the like. In some embodiments, the first electrode is an electrode for a lithium ion electrochemical cell. In some cases, the first electrode is an anode or negative electrode.

The second electrode (e.g., electrode 450 in FIG. 4) can comprise a variety of suitable electroactive materials. In some cases, the second electrode is a cathode or positive electrode.

In some embodiments, the electroactive material within an electrode (e.g., within a positive electrode) can comprise metal oxides. In some embodiments, an intercalation electrode (e.g., a lithium-intercalation cathode) may be used. Non-limiting examples of suitable materials that may intercalate ions of an electroactive material (e.g., alkaline metal ions) include oxides, titanium sulfide, and iron sulfide. Additional examples include $Li_xCoO_2$, $Li_xNiO_2$, $Li_xMnO_2$, $Li_xMn_2O_4$, $Li_xCoPO_4$, $Li_xMnPO_4$, $LiCo_xNi_{(1-x)}O_2$, $LiCo_xNi_yMn_{(1-x-y)}$ (e.g., $LiNi_{1/3}Mn_{1/3}Co_{1/3}O_2$), $Li_xNiPO_4$, where ($0<x\leq1$), $LiNi_xMn_yCo_zO_2$ where ($x+y+z=1$), and combinations thereof. In some embodiments, the electrode active material within an electrode (e.g., within a positive electrode) can comprise lithium transition metal phosphates (e.g., $LiFePO_4$), which can, in certain embodiments, be substituted with borates and/or silicates.

In certain embodiments, the electroactive material within an electrode (e.g., within a positive electrode) can comprise electroactive transition metal chalcogenides, electroactive conductive polymers, and/or electroactive sulfur-containing materials, and combinations thereof. As used herein, the term "chalcogenides" pertains to compounds that contain one or more of the elements of oxygen, sulfur, and selenium.

Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf. Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, an electrode (e.g., a positive electrode) can comprise an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. In certain embodiments, it may be desirable to use polypyrroles, polyanilines, and/or polyacetylenes as conductive polymers.

In certain embodiments, the electrode active material within an electrode (e.g., within a positive electrode) can comprise sulfur. In some embodiments, the electroactive material within an electrode can comprise electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a positive electrode) comprises at least about 40 wt % sulfur. In some cases, the electroactive sulfur-containing material comprises at least about 50 wt %, at least about 75 wt %, or at least about 90 wt % sulfur.

In certain embodiments, the sulfur-containing material (e.g., in an oxidized form) comprises a polysulfide moiety, $S_m$, selected from the group consisting of covalent $S_m$ moieties, ionic $S_m$ moieties, and ionic $S_{m_2}$-moieties, wherein m is an integer equal to or greater than 3. In some embodiments, m of the polysulfide moiety $S_m$ of the sulfur-containing polymer is an integer equal to or greater than 6 or an integer equal to or greater than 8. In some cases, the sulfur-containing material may be a sulfur-containing polymer. In some embodiments, the sulfur-containing polymer has a polymer backbone chain and the polysulfide moiety $S_m$ is covalently bonded by one or both of its terminal sulfur atoms as a side group to the polymer backbone chain. In certain embodiments, the sulfur-containing polymer has a polymer backbone chain and the polysulfide moiety $S_m$ is incorporated into the polymer backbone chain by covalent bonding of the terminal sulfur atoms of the polysulfide moiety.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723, 230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

While sulfur is described predominately as an electroactive species in the second electrode (which can be, for example, a porous positive electrode), it is to be understood that wherever sulfur is described as a component of an electroactive material within an electrode herein, any suitable electroactive species may be used. For example, in certain embodiments, the electroactive species within the second electrode (e.g., a porous positive electrode) can comprise a hydrogen-absorbing alloy, such as those commonly used in nickel metal hydride batteries. One of ordinary skill in the art, given the present disclosure, would be capable of extending the ideas described herein to electrochemical cells containing electrodes employing other active materials.

The embodiments described herein may be used in association with any type of electrochemical cell, such as a lithium-based electrochemical cell (e.g., a lithium-sulfur electrochemical cell, a lithium-ion electrochemical cell). In certain embodiments, the electrochemical cell is a primary (non-rechargeable) battery. In other embodiments, the electrochemical cell may be a secondary (rechargeable) battery. Certain embodiments relate to lithium rechargeable batteries. In certain embodiments, the electrochemical cell comprises a lithium-sulfur rechargeable battery. However, wherever lithium batteries are described herein, it is to be understood that any analogous alkali metal battery can be used. Additionally, although embodiments of the invention are particularly useful for protection of a lithium anode, the embodiments described herein may be applicable to other applications in which electrode protection is desired.

Any suitable electrolyte may be used in the electrochemical cells described herein. Generally, the choice of electrolyte will depend upon the chemistry of the electrochemical cell, and, in particular, the species of ion that is to be transported between electrodes in the electrochemical cell. Suitable electrolytes can comprise, in some embodiments, one or more ionic electrolyte salts to provide ionic conductivity and one or more liquid electrolyte solvents, gel polymer materials, or other polymer materials. Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes (e.g., 1,3-dioxolane), N-alkylpyrrolidones, bis(trifluoromethanesulfonyl)imide, substituted forms of the foregoing, and blends thereof. Fluorinated derivatives of the foregoing are also useful as liquid electrolyte solvents. In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

The electrolyte can comprise one or more ionic electrolyte salts to provide ionic conductivity. In some embodiments, one or more lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$) can be included. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. A range of concentrations of the ionic lithium salts in the solvent may be used such as from about 0.2 m to about 2.0 m (m is moles/kg of solvent). In some embodiments, a concentration in the range between about 0.5 m to about 1.5 m is used. The addition of ionic lithium salts to the solvent is optional in that upon discharge of Li/S cells the lithium sulfides or polysulfides formed typically provide ionic conductivity to the electrolyte, which may make the addition of ionic lithium salts unnecessary.

It should be understood that the electrochemical cells and components shown in is the figures are exemplary, and the orientation of the components can be varied. Additionally, non-planar arrangements, arrangements with proportions of materials different than those shown, and other alternative arrangements are useful in connection with certain embodiments of the present invention. A typical electrochemical cell could also include, for example, a containment structure, current collectors, external circuitry, and the like. Those of ordinary skill in the art are well aware of the many arrangements that can be utilized with the general schematic arrangement as shown in the figures and described herein.

As used herein, when a layer is referred to as being "on", "on top of", or "adjacent" another layer, it can be directly on, on top of, or adjacent the layer, or an intervening layer may also be present. A layer that is "directly on", "directly adjacent" or "in contact with" another layer means that no intervening layer is present. Likewise, a layer that is positioned "between" two layers may be directly between the two layers such that no intervening layer is present, or an intervening layer may be present.

The following examples are intended to illustrate certain embodiments of the present invention, but do not exemplify the full scope of the invention.

EXAMPLES

Example 1

The following steps were performed to make a hybrid layer (e.g., an organic-inorganic hybrid nanocomposite coating) on a CELGARD® 2500 separator layer to be used as a protective layer of a lithium anode in a lithium or lithium-ion battery.

A colloid of alumina nanoparticles (having an average diameter of about 14 nm) with the crystalline phase of Boehmite, AlO(OH), was formed in water.

Next, a water-based coating solution was prepared. Pre-hydrolyzed Glymo was added into the alumina nanoparticle colloid solution. The solution was stirred for 30 minutes. Jeffamine (ED 2003) was then added into the mixture, and stirred for one hour. The solution was allowed to age at room temperature for one day.

The aged solution was then drop cast directly onto the separator layer to form a coating. The coating was allowed to dry for about 15 minutes at room temperature and atmospheric pressure. The coating sample was then placed into a vacuum oven preset at 75° C. to further dry or cure for overnight. A hybrid coating with about 1-3 μm in thickness was obtained. Without being bound to a particular theory, it was thought that the coating solution was partially infiltrated into the pores underneath the separator layer surface, which would endow the hybrid coatings with very strong adhesion on the separator layer.

Due to the heat-sensitive nature of the substrate, the coatings were not heated above around 80° C. As a result, there still existed a significant amount of —OH groups and residual water in the coatings even after vacuum drying for extended time.

In a dry room, the sample was dipped into a container of TaF$_5$ solution in anhydrous methanol that had been gently agitated. After one minute, the samples were withdrawn from the container. The samples were allowed to dry at ambient temperature and pressure in the dry room. It is believed that after this step, the remaining —OH groups and water in the coatings were fully converted through a series of non-hydrolytic sol-gel reactions.

Example 2

An electrochemical cell comprising a fluorinated sol-gel coated CELGARD® 2500 separator layer was assembled as described in Example 1. The cell was cycled through a charge/discharge cycle. EDX elemental mapping of the surface of the lithium anode of the cycled cell showed the uniform distribution of both tantalum and fluorine, confirming the presence of a layer comprising LiF formed on the surface of the lithium metal anode, as shown in FIGS. 7A-7C.

Example 3

TaF$_5$-modified 25-μm CELGARD® 2500 separator layers formed by the process described in Example 1 were assembled into electrochemical cells and tested for performance.

Small flat cells with the following configuration were assembled: a PET/PVOH/Cu/Vacuum-deposited Li anode, and a lithium iron phosphate (LFP) cathode. As a control group cells were also assembled using an uncoated, plain CELGARD® 2500 separator layer.

Figure 8:
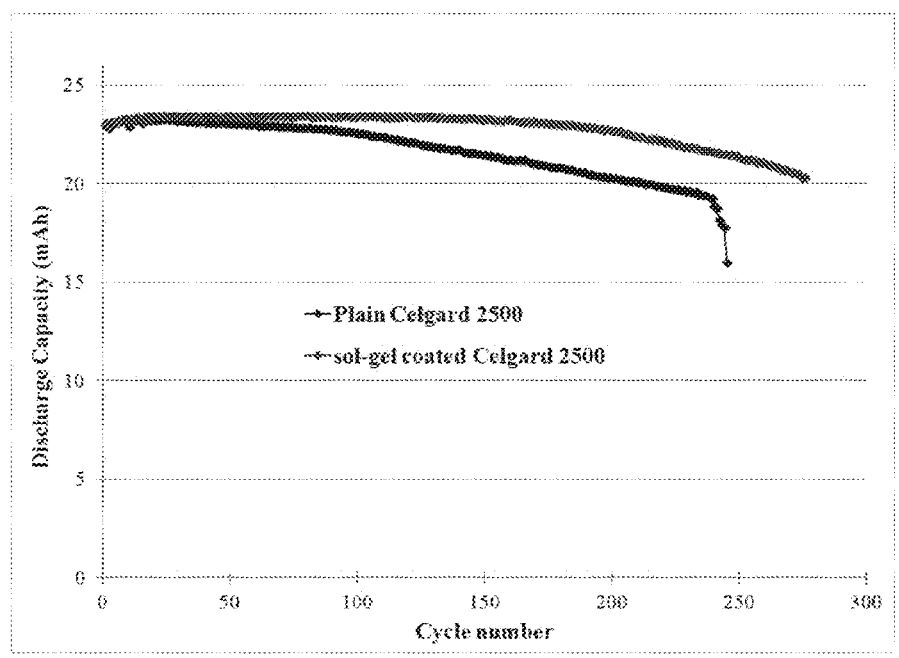
FIG. 8 is graph comparing performance of a cell comprising an uncoated separator and a cell comprising a separator having an enhanced coating layer, according to certain embodiments.

The cells were secured with ¼" wide polyimide tape and placed into a bag (package material consisting of polymer coated aluminum foil available from Sealrite Films, San Leandro, Calif.). A 1 M LiPF$_6$ solution in ethylene carbonate and dimethyl carbonate (50:50 volume ratio), 0.35 mL, was added as electrolyte, and the cell was vacuum sealed. Testing was performed at a discharge current of 0.265 mA/cm$^2$ to a voltage of 2.5 V and a charge current of 0.166 mA/cm$^2$ to 4.2 V. As shown in FIG. 8, the cell with sol-gel coated and TaF$_5$-treated separator showed longer cycle life and higher discharge capacity than the control cell with a plain (unmodified) separator.

Example 4

Similar steps were performed as described in Example 1 for successfully coating a CELGARD® 2500 separator layer, with a TaBr$_5$ solution substituted for the TaF$_5$ solution.

Example 5

Figure 9:
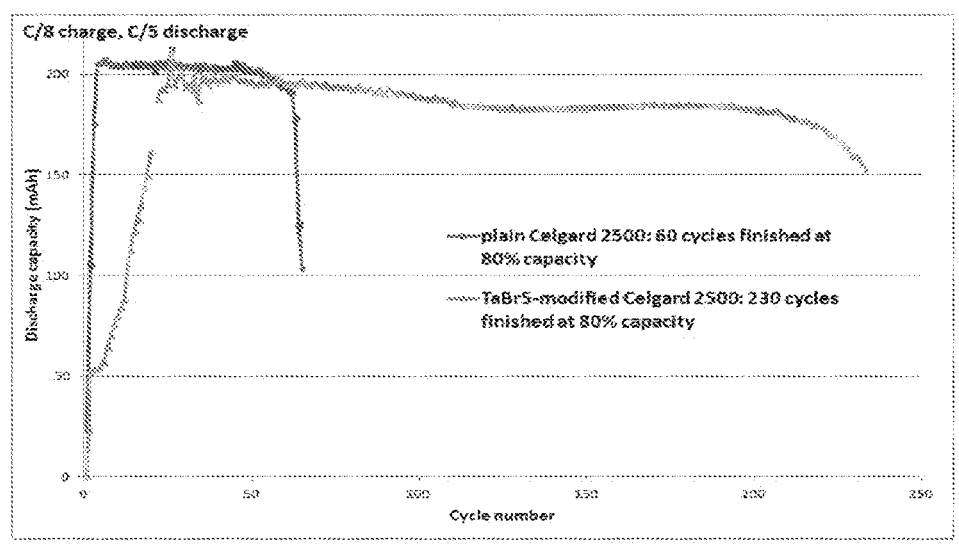
FIG. 9 is graph comparing performance of a cell comprising an uncoated separator and a cell comprising a separator having an enhanced coating layer, according to certain embodiments.

TaBr$_5$-modified 25-μm CELGARD® 2500 separator layers formed by the process described in Example 4 were assembled into electrochemical cell and tested for performance. Medium flat cells with the following configuration were assembled: a PET/PVOH/Cu/Vacuum-deposited Li anode, a brominated sol-gel coated CELGARD® 2500 separator layer, and a Ni—Mn—Co oxide (NMC) cathode. As a control group cells were also assembled using an uncoated, plain CELGARD® 2500 separator layer. The cells were secured with ¼" wide polyimide tape and placed into a bag (package material consisting of polymer coated aluminum foil available from Sealrite Films, San Leandro, Calif.). A 1 M $LiPF_6$ solution in ethylene carbonate and dimethyl carbonate (50:50 volume ratio), 0.55 mL, was added as electrolyte, and the cell was vacuum sealed. Testing was performed at a discharge current of 0.80 $mA/cm^2$ to a voltage of 3.2 V and a charge current of 0.50 $mA/cm^2$ to 4.35 V. As shown in FIG. 9, the cell with sol-gel coated and $TaBr_5$-treated separator showed much longer cycle life than the control cell with a plain (unmodified) separator (at 80% of the initial discharge capacity, 230 cycles were finished for the sample cell versus 60 cycles for the control cell).

Example 6

To demonstrate the flexibility of the hybrid layer on the separator, a sample was prepared according to the process outlined below and a bend test on the sample was performed.

The following steps were performed to make a hybrid layer coating on a CELGARD® 2500 separator layer to be used as a protective layer of a lithium anode in a lithium or lithium-ion battery. The process is similar to that applied in Examples 1 and 4 above without the step of immersing into a metal halide solution.

A colloid of alumina nanoparticles (having an average diameter of about 14 nm) with the crystalline phase of Boehmite, AlO(OH), was formed in water.

Next, a water based coating solution was prepared. Pre-hydrolyzed Glymo was added into the alumina nanoparticle colloid solution. The solution was stirred for 30 minutes. Jeffamine (ED 2003) was then added into the mixture, and stirred for one hour. The solution was allowed to age at room temperature for one day.

The aged solution was then drop cast directly onto the separator layer to form a coating. The coating was allowed to dry for about 15 minutes at room temperature and atmospheric pressure. The coating sample was then placed into a vacuum oven preset at 75° C. to further dry or cure for overnight. A hybrid layer coating with about 1-3 μm in thickness was obtained.

The sample was then subjected to a bend test to demonstrate its flexibility and imperviousness to cracking. The sample was draped on a ferrule 5 mm in length with a diameter of 3 mm at the smaller end and 7 mm at the wider end and bent around the diameter. Testing was performed along every 1 mm along the ferrule, where the diameter was 3, 4, 5, 6, and 7 mm. The sample did not crack.

The successful performance of the sample in the bending test demonstrates the advantageous flexibility of the hybrid layer formed.

It should be understood that the electrochemical cells and components shown in the figures are exemplary, and the orientation of the components can be varied. Additionally, non-planar arrangements, arrangements with proportions of materials different than those shown, and other alternative arrangements are useful in connection with certain embodiments of the present invention. A typical electrochemical cell could also include, for example, a containment structure, current collectors, external circuitry, and the like. Those of ordinary skill in the art are well aware of the many arrangements that can be utilized with the general schematic arrangement as shown in the figures and described herein.

As used herein, when a layer is referred to as being "on", "on top of", or "adjacent" another layer, it can be directly on, on top of, or adjacent the layer, or an intervening layer may also be present. A layer that is "directly on", "directly adjacent" or "in contact with" another layer means that no intervening layer is present. Likewise, a layer that is positioned "between" two layers may be directly between the two layers such that no intervening layer is present, or an intervening layer may be present.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
    an electrode comprising lithium as an electroactive material; and
    a hybrid layer comprising an inorganic material and an organic polymer proximate a surface of the electrode, the hybrid layer further comprising a tantalum-containing compound, wherein the tantalum-containing compound comprises a compound of the formula: $TaX_{5-y-z}(A)_y(OH)_z$, where, X=F, Br, Cl, or I; y=0 to 5, z=0 to 5, and y+z=1 to 5; and A=an oxygen-based anion.

2. An article of claim 1, wherein z=0.

3. An article of claim 2, wherein A is a species selected from the group consisting of: an alkoxide having a carbon number of 1 to 8, acetylacetonate, 2-ethylhexyloxide, and acetate.

4. An article of claim 3, wherein $A=OCH_3$.

5. An article of claim 4, wherein X=F.

6. An article of claim 5, wherein X=Br.

7. An article of claim 1, wherein the article further comprises a separator on which the hybrid layer is deposited.

8. An article of claim 7, wherein the electrode is an anode.

9. An article of claim 8, wherein the hybrid layer is positioned between the separator and the anode.

10. An article of claim 9, wherein the organic polymer comprises a polyetheramine species.

11. An article of claim 9, wherein the inorganic material comprise alumina nanoparticles.

12. An article of claim 1, wherein the electrode is an anode.

13. An article of claim 1, wherein the hybrid layer comprises a crosslinked network of inorganic nanoparticles and the organic polymer.

14. An article of claim 1, further comprising:
    a separator comprising pores; wherein
    the tantalum-containing compound is in at least a portion of the pores of the separator.

15. The article of claim 14, wherein the hybrid layer is deposited on the separator.

16. The article of claim 15, wherein the hybrid layer comprises a crosslinked network of inorganic nanoparticles and the organic polymer.

17. An article of claim 15, wherein the organic polymer comprises a polyetheramine species.

18. An article of claim 15, wherein the inorganic material comprise alumina nanoparticles.

19. An article of claim 1, wherein the organic polymer comprises a polyetheramine species.

20. An article of claim 1, wherein the inorganic material comprise alumina nanoparticles.

* * * * *

UNITED STATES PATENT AND TRADEMARK OFFICE
CERTIFICATE OF CORRECTION

PATENT NO. : 10,991,925 B2
APPLICATION NO. : 16/098654
DATED : April 27, 2021
INVENTOR(S) : Zhongchun Wang et al.

Page 1 of 1

It is certified that error appears in the above-identified patent and that said Letters Patent is hereby corrected as shown below:

In the Claims

Column 28, Claim 3, Line 6, "article of claim 2" should be "article of claim 1"

Column 28, Claim 4, Line 10, "article of claim 3" should be "article of claim 1"

Column 28, Claim 5, Line 11, "article of claim 4" should be "article of claim 1"

Column 28, Claim 6, Line 12, "article of claim 5" should be "article of claim 1"

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*